(12) United States Patent
Huang et al.

(10) Patent No.: US 10,061,964 B2
(45) Date of Patent: Aug. 28, 2018

(54) PRESS SHEET FOR FINGERPRINT READER AND FINGERPRINT READER

(71) Applicants: Industrial Technology Research Institute, Hsinchu (TW); Gingy Technology Inc., Hsinchu (TW)

(72) Inventors: Hsiao-Feng Huang, Taoyuan (TW); Ping-Chen Chen, Taipei (TW); Chun-Chen Chiang, Hsinchu (TW); Pei-Chi Chien, Hsinchu County (TW); Jen-Chieh Wu, Pingtung County (TW)

(73) Assignees: Industrial Technology Research Institute, Hsinchu (TW); Gingy Technology Inc., Hsinchu (TW)

( * ) Notice: Subject to any disclaimer, the term of this patent is extended or adjusted under 35 U.S.C. 154(b) by 412 days.

(21) Appl. No.: 14/822,891

(22) Filed: Aug. 10, 2015

(65) Prior Publication Data

US 2016/0117543 A1   Apr. 28, 2016

Related U.S. Application Data

(60) Provisional application No. 62/067,966, filed on Oct. 23, 2014.

(51) Int. Cl.
*G06K 9/20* (2006.01)
*G06K 9/00* (2006.01)
(Continued)

(52) U.S. Cl.
CPC .......... *G06K 9/00046* (2013.01); *G02B 1/14* (2015.01); *G02B 5/0231* (2013.01); *G02B 5/0242* (2013.01); *G02B 5/0278* (2013.01)

(58) Field of Classification Search
CPC ...... G06K 9/00013–2009/0006; G02B 5/0242
See application file for complete search history.

(56) References Cited

U.S. PATENT DOCUMENTS 8,204,284 B2 * 6/2012 Wu .................... G06K 9/00046
382/100
8,391,569 B2   3/2013 Wu
(Continued)

FOREIGN PATENT DOCUMENTS

CN   102467660   5/2012
CN   102682280   9/2012
(Continued)

OTHER PUBLICATIONS

"Scientific Polymer Products, Inc.", no named author, captured from website http://scientificpolymer.com/technical-library/refractive-index-of-polymers-by-index/ on Jan. 26, 2018, 8 pages total. (Year: 2018).*

(Continued)

*Primary Examiner* — Brian P Werner
(74) *Attorney, Agent, or Firm* — JCIPRNET (57) ABSTRACT

A press sheet for fingerprint reader and a fingerprint reader are provided. The press sheet includes a transparent substrate, a microstructure layer, and a diffusion layer. The transparent substrate has a first surface and a second surface, and the first surface faces towards an optical imaging apparatus. The microstructure layer is disposed on the first surface of the transparent substrate, and the diffusion layer contains diffusion particles.

12 Claims, 6 Drawing Sheets

(51) Int. Cl.
G02B 5/02 (2006.01)
G02B 1/14 (2015.01)

(56) References Cited

U.S. PATENT DOCUMENTS

| | | | |
|---|---|---|---|
| 8,520,912 B2 | 8/2013 | Wu et al. | |
| 2001/0055412 A1 | 12/2001 | Burrows et al. | |
| 2005/0111707 A1* | 5/2005 | Bohn | G06K 9/00026 382/124 |
| 2009/0190067 A1* | 7/2009 | Hamamatsu | G02B 5/0242 349/64 |
| 2010/0172552 A1 | 7/2010 | Wu | |
| 2010/0208954 A1 | 8/2010 | Wu | |
| 2016/0092718 A1* | 3/2016 | Jensen | G06K 9/00013 382/124 |
| 2016/0110025 A1* | 4/2016 | Hossu | G06F 3/0412 382/124 |

FOREIGN PATENT DOCUMENTS

| | | |
|---|---|---|
| CN | 102955936 | 3/2013 |
| TW | 201032145 | 9/2010 |
| TW | 201250552 | 12/2012 |
| TW | 201308215 | 2/2013 |
| TW | 201310353 | 3/2013 |

OTHER PUBLICATIONS

"The Physics Factbook, An encyclopedia of scientific essays", no named author, captured from website https://hypertextbook.com/facts/2008/SydneyWarshaw.shtml on Jan. 26, 2018, 2 pages total. (Year: 2018).*

"Office Action of China Counterpart Application," dated Jul. 14, 2017, p. 1-p. 6, in which the listed references were cited.

Kuo et al., "Design correlations for the optical performance of the particle-diffusing bottom diffusers in the LCD backlight unit," Powder Technology, May 15, 2009, pp. 116-121.

Hu et al., "The novel optical diffusers based on the fillers of boehmite hollow microspheres," Materials Letters, Dec. 1, 2014, pp. 114-117.

Geun Hyung Kim, "A PMMA composite as an optical diffuser in a liquid crystal display backlighting unit (BLU)," European Polymer Journal, Aug. 2005, pp. 1729-1737.

Shih et al., "Fabrication of PDMS (polydimethylsiloxane) microlens and diffuser using replica molding," Microelectronic Engineering, Jun. 22, 2006, pp. 2499-2503.

Joo et al., "Design guidance of backlight optic for improvement of the brightness in the conventional edge-lit LCD backlight," Apr. 2010, pp. 87-92.

"Office Action of Taiwan Counterpart Application", dated Apr. 26, 2016, p. 1-p. 7, in which the listed references were cited.

* cited by examiner

PRESS SHEET FOR FINGERPRINT READER AND FINGERPRINT READER

CROSS-REFERENCE TO RELATED APPLICATION

This application claims the priority benefit of U.S. provisional application Ser. No. 62/067,966, filed on Oct. 23, 2014. The entirety of each of the above-mentioned patent applications is hereby incorporated by reference herein and made a part of this specification.

TECHNICAL FIELD

The present disclosure relates to a press sheet for fingerprint reader and a fingerprint reader.

BACKGROUND

Fingerprints are one of many forms of biometrics used to identify individuals and verify their identities. Fingerprint readers have been gradually incorporated with many electronic products as password security protections such as access control system, and the combination devices with vehicle, notebook computers, mobile phones, flash drives, mouse and keyboard etc. The analysis of fingerprints for matching purposes generally requires the comparison of several features of the print pattern. These include patterns, which are aggregate characteristics of ridges, split, split and join and minutia points, which are unique features found within the patterns.

Fingerprint reader generally has an optical, capacitive, ultrasonic and thermal induction type, etc. Optical fingerprint reader belongs to the total reflection type, it commonly includes an optical module and an optical imaging apparatus.

It is difficult and complicated to assemble the total reflection type fingerprint reader. Since people must precisely arrange the optical module and an optical imaging apparatus in the assembly process in order to effectively adjust the angle of the light incident and emergent beams. Furthermore, the emitting source of optical type fingerprint reader is usually a point light source, it easily leads to the blurred image due to uneven distribution of light.

SUMMARY

In accordance with the disclosure, embodiments of the present disclosure are directed to a press sheet for fingerprint reader comprising a transparent substrate, a microstructure layer, and a diffusion layer. The transparent substrate has a first surface and a second surface, and the first surface faces an optical imaging apparatus. The microstructure layer is disposed on the first surface of the transparent substrate. The diffusion layer is disposed on the second surface of the transparent substrate, and comprises a plurality of diffusion particles.

In one embodiment, the aforementioned diffusion layer includes resin. The resin comprises acrylic, epoxy resin, polyester, polyurethane (PU), PU acrylic, polysiloxane or a combination thereof.

According to the disclosure, the resin and the diffusion particles have a refractive index difference of 0.01 to 1.5. The diffusion particles and the resin have a weight ratio of 0.01 to 2.0.

The aforementioned diffusion particles include polystyrene, poly methyl acrylate, methyl methacrylate and styrene copolymer, polycarbonate, polyethylene, silicone resins, calcium carbonate, silica, titanium dioxide, or a combination thereof.

One embodiment of the disclosure, the diffusion particles have a particle size of 0.01 μm to 30.0 μm.

The aforementioned diffusion layer has a thickness of 1 μm to 80 μm in one embodiment of the disclosure.

In one embodiment of the disclosure, the materials of transparent substrate include polyethylene terephthalate (PET), polycarbonate (PC), polymethyl methacrylate (PMMA), and cellulose triacetate (TAC).

In one embodiment of the disclosure, the microstructure layer has at least one of the structure of prismatic (prism), lenticular lens (lenticular), semi-circular dome, pyramid, cylinder or regular polygonal.

The aforementioned microstructure has at least an arrangement of random or period in one embodiment of the disclosure.

According to the disclosure, the transparent substrate and the microstructure layer are integrated.

In the present disclosure, the press sheet further comprises a protective layer which is disposed on the diffusion layer. The protective layer could be a hard coating.

The present disclosure also relates to a fingerprint reader. The fingerprint reader comprises the aforementioned press sheet and at least one optical imaging apparatus. In one embodiment of the disclosure, the optical imaging apparatus includes light source and an optic camera lens, and the optic camera lens is arranged between the light source and the press sheet.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

The disclosure will now be described with reference to the accompanying figures. It is to be understood that the specific illustrated in the attached figures and described in the following description is simply an exemplary embodiment of the present disclosure. This description is made for the purpose of illustrating the general principles of the disclosure and should not be taken in a limiting sense. The scope of the disclosure is best determined by reference to the appended claims Referring to FIG. 1, it shows a fingerprint reader in one embodiment of the present disclosure. A major part of the fingerprint reader is a press sheet 100 which includes a transparent substrate 102, microstructure layer 104 and a diffusion layer 106. The transparent substrate 102 has a first surface 102a and a second surface 102b. The microstructure layer 104 is disposed on the first surface 102a of the transparent substrate and could be one of shapes of prismatic (prism), lenticular lens (lenticular), semi-circular dome, pyramid, cylinder and regular polygonal. The aforementioned microstructure layer has arrangements of random, period or a combination thereof. The diffusion layer 106 is disposed on the second surface 102b of the transparent substrate and includes diffusion particles 108.

Figure 1:
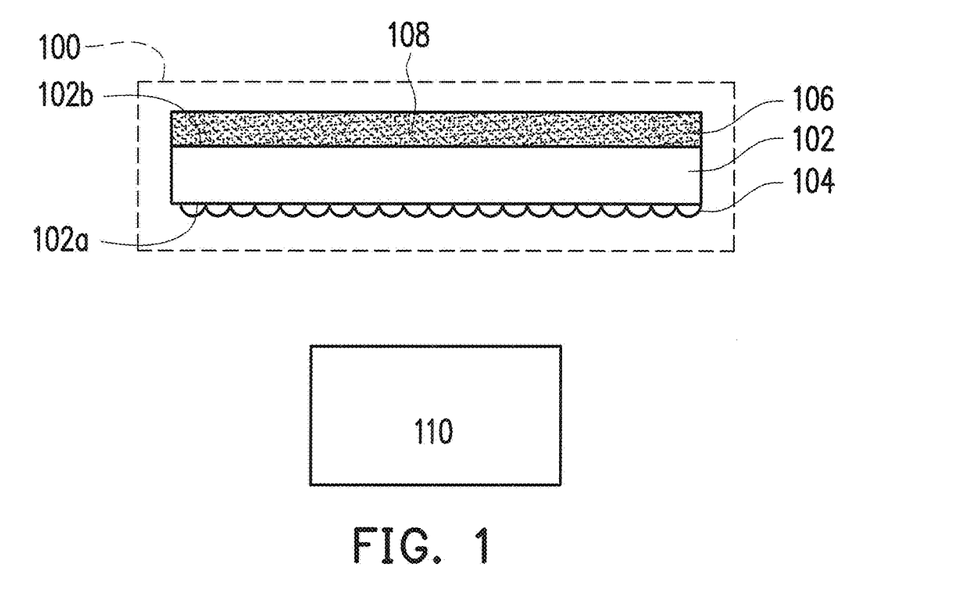
FIG. 1 is a cross-sectional view of the fingerprint reader in accordance with an embodiment.

The aforementioned transparent substrate 102 is made of for instance, polyethylene terephthalate (PET), polycarbonate (PC), polymethyl methacrylate (PMMA), cellulose tri-acetate (TAC) or any other transparent materials. As the first surface 102a of the transparent substrate 102 faces toward to an optical imaging apparatus 110, due to the diffusion particles 108 of the diffusion layer 106 may cause uniform distribution of light. In an embodiment of the disclosure, the diffusion layer 106 further comprises resin, such as UV curable resin, the mal curable resin and so on. Generally speaking, the resin includes acrylic, epoxy, polyester, PU, PU acrylic, polysiloxane or a combination thereof. Otherwise, uniform distribution of light may cause from the resin and the diffusion particles 108 have the refractive index difference of 0.01 to 1.5. In an embodiment of the present disclosure, the diffusion particles 108 comprise polystyrene, poly methyl acrylate, methyl methacrylate and styrene copolymer, polycarbonate, polyethylene, silicone resins, calcium carbonate, silica, titanium dioxide, or a combination thereof. The diffusion particles 108 have a particle size of 0.01 µm to 30.0 µm. The present disclosure is not limited to this.

The fingerprint identification and the accuracy should be raised due to the aforementioned diffusion layer 106, it may cause the haze of press sheet 100 larger than for instance 95%. Moreover, the more amounts of the diffusion particles 108 of the diffusion layer 106 and/or the more thickness of the diffusion layer 106 may make further raising the haze. For example, the diffusion layer 106 has the thickness of 1 µm to 80 µm or the diffusion particles and the resin have weight ratio of 0.01 to 10.0, and more particular have 0.1 to 2.0.

Figure 2:
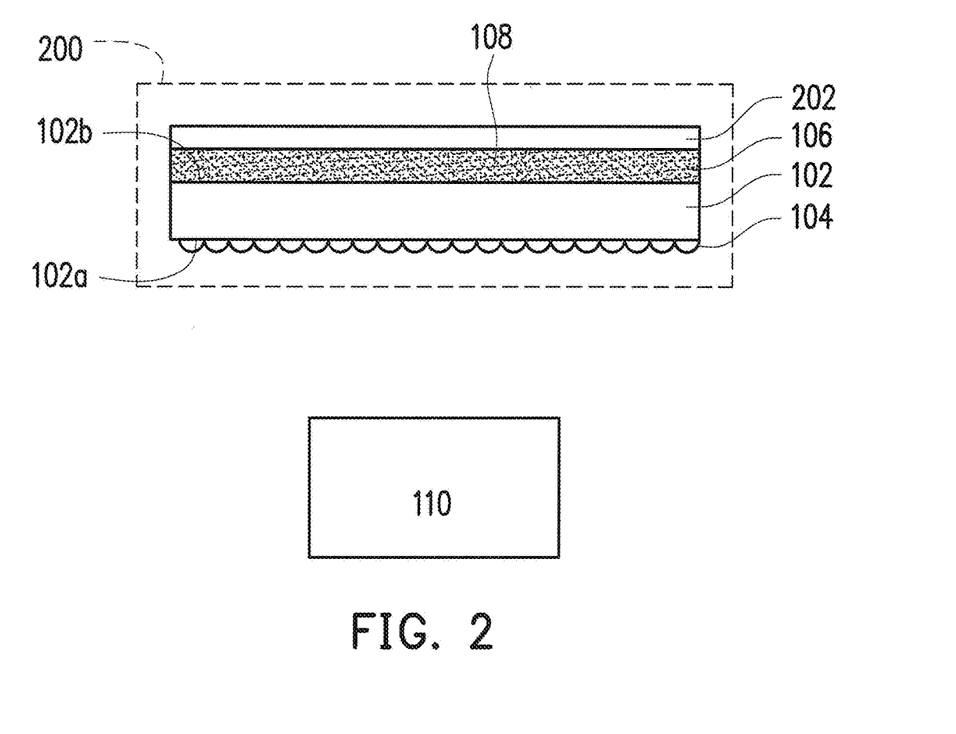
FIG. 2 is a cross-sectional view of the fingerprint reader in accordance with another embodiment.

FIG. 2 is a cross-sectional view of another embodiment. Using the same elements as the previous embodiment symbols to represent the same or similar components.

Referring to FIG. 2, in this embodiment the fingerprint reader includes press sheet 200 which is similar to that of in FIG. 1, not only includes transparent substrate 102, microstructure layer 104 and diffusion layer 106 but also includes a protection layer 202 disposed on the diffusion layer 106. The protection layer 202, for instance could be a hard-coat which is coated on the diffusion layer 106 for increasing the lifetime of the press sheet 200, scratch resistance and so on. The hard-coat includes acrylic resin, epoxy resin, polyester, polyurethane (PU), PU acrylic, polysiloxane, acrylic resin with inorganic particles, epoxy with inorganic particles, polysiloxane with inorganic particles, polyester with inorganic particles, PU with inorganic particles, PU acrylic with inorganic particles or a combination thereof.

Figure 3:
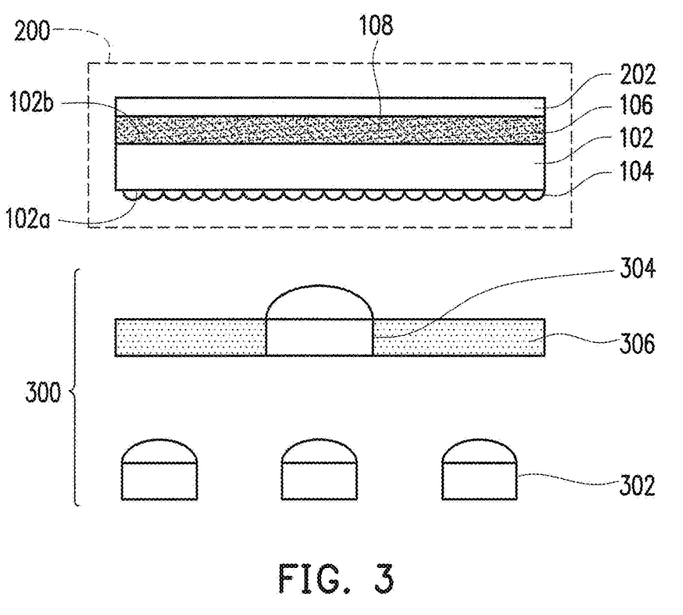
FIG. 3 is a cross-sectional view of the fingerprint reader in accordance with yet another embodiment.
Figure 4A:
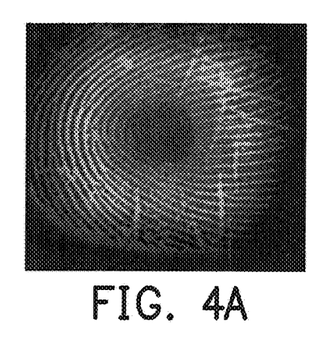
FIG. 4A to FIG. 4E are images in accordance with example 1.
Figure 4B:
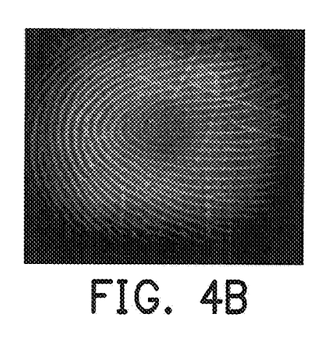
Figure 4C:
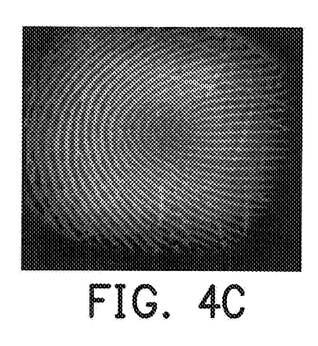
Figure 4D:
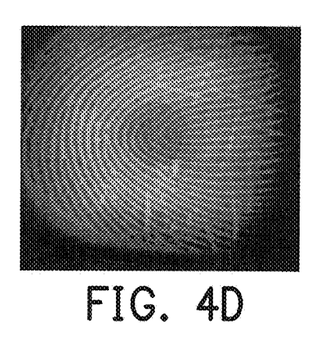
Figure 4E:
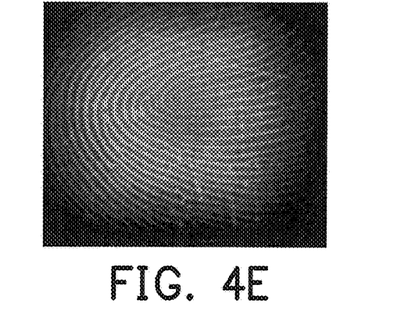

Referring to FIG. 3, in this embodiment the fingerprint reader includes press sheet 200 which is similar to that of in FIG. 2. Using the same elements as the previous embodiment symbols to represent the same or similar components. There is an optical imaging apparatus 300 arranged toward the press sheet. The optical imaging apparatus 300 includes a light source 302 and an optic camera lens 304. The optic camera lens 304 is arranged between the light source 302 and the press sheet 200. Although FIG. 3 shows three light sources 302 in this embodiment, for the present disclosure is not limited to this. Otherwise, the optic camera lens 304 may embed in the diffusion layer 306 for an alternative.

Below, exemplary embodiments will be described to verify the efficacy of the present disclosure, but the disclosure is not limited to the exemplary embodiments set forth herein.

Haze Measurement

The measurements were conducted with a haze meter (made by NIPPON DENSHOKU with a trade number of NDH 2000) with the build-in Method 3 which is the standard test of JIS K 7136, ISO 14782. The sample was placed with the structure surface faced to light source of the haze meter.

Example 1

Toluene and a little amount of isopropanol served as a solvent. The isopropanol (IPA) and diffusion particles (manufactured by JX Nippon oil & Energy Corporation, with a trade number NMB-0120C, refraction index of 1.49) had weight ratio of 0.03 (IPA/NMB-0120C=0.03). Fluorosurfactant (manufactured by 3M with a trade number of FC4432) served as a dispersant. The fluorosurfactant (FC4432) and diffusion particles NMB-0120C had weight ratio of 0.012 (FC4432/NMB-0120C=0.012). Toluene, isopropanol, NMB-0120C, fluorosurfactant, and UV glue (refractive index of 1.60) were mixed and stirred at room temperature for about 2 hours, a mixture (diffusion layer solution) was obtained and had solid content of about 70 wt %. The NMB-0120C (diffusion particles) and UV glue had weight ratio of 0.3.

The above mixture was coated on one flat surface of the PET film having a thickness of 90 µm to 95 µm which with microlens structure surface opposite to the flat surface to form a coated PET film. After drying at 80° C. for about 3 minutes, it was cured with UV light to form a dry film with the thickness of 7 µm as sample 1-1.

Sample 1-2 to sample 1-4 were prepared same as sample 1-1 with the only difference in sample 1-2 to sample 1-4 were the thickness of dry film of 9 µm, 13 µm and 17 µm respectively.

Sample 1-5 was prepared same as sample 1-4 except for further coating acrylic PU resin on the dry film with a thickness of 17 µm, and cured with UV light to form a protective layer with the thickness of 8 µm.

Comparative sample 1 was a PET film which one surface had microlens structure.

The haze measured and tabulated in Table 1.

TABLE 1

| | Thickness of diffusion layer | Haze for diffusion layer | Total Haze | Imaging identity |
|---|---|---|---|---|
| Comparative sample 1 | No coating layer | | 94.39% | X |
| Sample 1-1 | 7 µm | 78.56% | 97.78% | Δ |
| Sample 1-2 | 9 µm | 88.62% | 98.38% | ○ |
| Sample 1-3 | 13 µm | 93.62% | 98.68% | ○ |

TABLE 1-continued

|  | Thickness of diffusion layer | Haze for diffusion layer | Total Haze | Imaging identity |
|---|---|---|---|---|
| Sample 1-4 | 17 μm | 97.24% | 98.92% | O |
| Sample 1-5 | 17 μm | 97.24% | 99.05% | O |

As shown in Table 1 and refer to FIG. 4A to FIG. 4E, the imaging identity of comparative sample 1 was bad (X), sample 1-1 was normal (Δ), and sample 1-2 to sample 1-5 were all good (O).

According to Table 1 and FIG. 4A to FIG. 4E, it shows that no identified imaging was found in the central region of the one-side microlens structure film (comparative sample 1). The central region of the fingerprint imaging with total haze of 97.78% was unobvious. The identification in central region of the fingerprint imaging for the total haze more than 98% was obvious and easy to distinguish.

Example 2

A diffusion layer solution was prepared same as example 1. The diffusion layer solution was coated on the flat surface of the PET film having the thickness of 155 μm which with single prism structure opposite to the flat surface to form a coated PET film. After drying at 80° C. for about 3 minutes, it was cured with UV light to form a dry film with the thickness of 16 μm as sample 2-1.

Sample 2-2 was prepared same as sample 2-1 except for the thickness for dry film of 16 μm. Further coated acrylic PU resin on the dry film with a thickness of 16 μm, and cured with UV light to form a protective layer with the thickness of 8 μm.

Comparative sample 2 was a PET film which one surface had prism structure.

The haze measured and tabulated in Table 2.

TABLE 2

|  | Thickness of diffusion layer | Haze for diffusion layer | Total Haze | Imaging identity |
|---|---|---|---|---|
| Comparative sample 2 | No coating layer (with one prism structure surface) |  | — | X |
| Sample 2-1 | 16 μm | 97.37% | — | O |
| Sample 2-2 | 16 μm (with hard coating) | 88.62% | — | O |

Figure 5A:
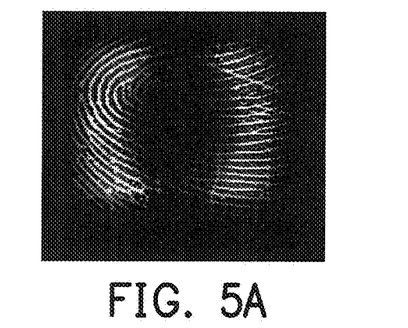
FIG. 5A to FIG. 5C are images in accordance with example 2.
Figure 5B:
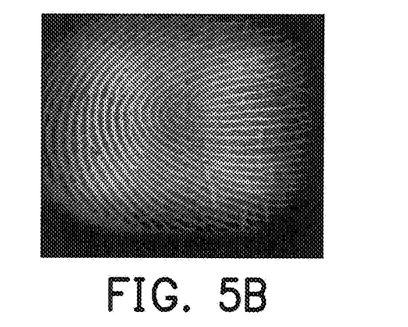
Figure 5C:
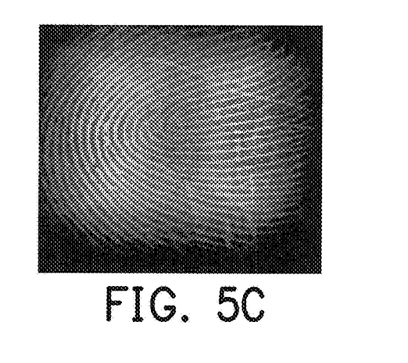

FIG. 5A to FIG. 5C show the imaging for comparative sample 2, sample 2-1 and sample 2-1. As shown in Table 2 and refer to FIG. 5A to FIG. 5C, the imaging identity of comparative sample 2 was bad (X), sample 2-1 and sample 2-1 were good (O). The longitudinal direction in FIG. 5A will change as the strip direction of the prism. That is the longitudinal direction is parallel to the strip direction of the prism. For instance, the strip of the prism turns 90 degrees in FIG. 5A, and the imaging in FIG. 5A to FIG. 5C are also turn 90 degrees. In addition, it is meaningless to measure the total haze since when light source irradiates the prism structure surface of the dry film, most of the light is reflected so the transmitted light is very weak that may cause the calculation for haze is distorted.

According to Table 2 and FIG. 5A to FIG. 5C, it shows that no identified imaging was found in the central region of the plain prism structure film. The identification in central region of the fingerprint imaging for coated film was obvious to distinguish.

Example 3

Added lauryl acrylate (LA), MMA, toluene, Benzoyl peroxide (BPO) (IUPAC diphenylperoxyanhydride) with the weight ratio of 3:7:15:0.3 to the closed reactor having reflux condenser, mixed with stirrer for 10 minutes in Nitrogen atmosphere then stopped introducing Nitrogen gas and kept stirring for 10 hours, a solution called LA30-MMA70 was obtained. In the aforementioned reaction, the reaction temperature was set at about 90° C. and the reflux condenser for the temperature was set at 15° C.-25° C. The heating method was used heating package. The refractive index of the solution LA30-MMA70 was about 1.47.

Toluene and a little amount of isopropanol solution served as a solvent. The isopropanol solution was prepared with isopropanol and NMB-0120C for the weight ratio of 0.03 (IPA/NMB0120C=0.03). Fluorosurfactant (manufactured by 3M with a trade number of FC4432) served as a dispersant of (FC4432/SBX4=0.06 wt %). Added diffusion particles with the refractive index of 1.59 (manufactured by SEKISUI with a trade number of SBX4) and LA30-MMA70 with the weight ratio of 0.5 to the reactor which had solvent and dispersant then mixed and stirred at room temperature for about 2 hours. After mixing and stirring, a mixture (diffusion layer solution) was obtained and had solid content of about 30.4 wt %.

The above mixture was coated on the flat surface of the PET film having a thickness of 95 μm which with microlens structure surface opposite to the flat surface to form a coated PET film. After drying at 100° C. for about 3 minutes, a dry film was obtained as sample 3-1.

Sample 3-2 was prepared same as sample 3-1 except for the coated PE film having a thickness of 155 μm and one surface of the PET film was prism structure. After drying at 100° C. for about 3 minutes, a dry film was obtained with the thickness of 14 μm.

The haze measured and tabulated in Table 3.

TABLE 3

|  | Thickness of diffusion layer | Haze for diffusion layer | Total Haze | Imaging identity |
|---|---|---|---|---|
| Sample 3-1 | 14 μm | 96.97% | 99.13% | O |
| Sample 3-2 | 14 μm | 96.97% | — | O |

Figure 6A:
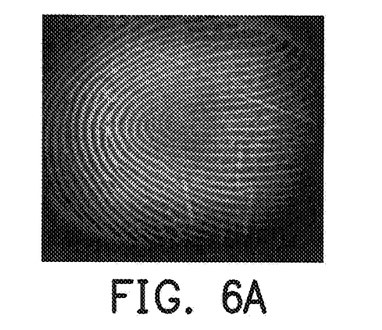
FIG. 6A and FIG. 6B are images in accordance with example 3.
Figure 6B:
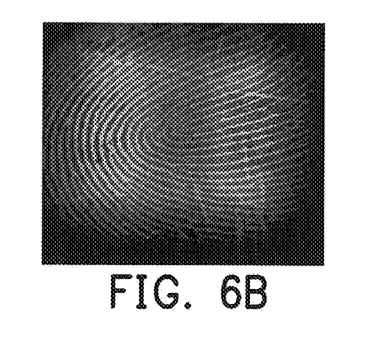

FIG. 6A and FIG. 6B show the fingerprint images for sample 3-1 and sample 3-2. As shown in Table 3 and refer to FIG. 6A to FIG. 6B, both of them have good imaging identity. According to the results, even if one surface of the PET film has different structure, the identification in central region of the fingerprint imaging for coated film was obvious to distinguish.

Example 4

Preparation of Diffusion Layer Solution

Toluene and isopropanol served as a solvent. The isopropanol (IPA) and titanium oxide ($TiO_2$, manufactured by DuPont with a trade number R350) had weight ratio of 0.0435 (IPA/$TiO_2$=0.0435). Fluorosurfactant (manufactured by 3M with a trade number of FC4432) served as a dispersant. The fluorosurfactant (FC4432) and titanium oxide ($TiO_2$, manufactured by DuPont with a trade number R350, refractive index of 2.6) had weight ratio of 0.012 (FC4432/TiO$_2$=0.012). Toluene, isopropanol, titanium oxide, fluorosurfactant, and UV glue (refractive index of 1.58) were mixed and stirred at room temperature for about 2 hours, a mixture (diffusion layer solution) was obtained and had solid content of about 70 wt %. The titanium oxide and UV glue had weight ratio of 0.1.

The above mixture was coated on one flat surface of the PET film having a thickness of 90 μm to 95 μm which with microlens structure surface opposite to the flat surface to form a coated PET film. After drying at 80° C. for about 3 minutes, it was cured with UV light to form a dry film with the thickness of 12 μm as sample 4-1. Sample 4-2 was prepared same as sample 4-1, the difference in sample 4-2 was the thickness of the dry film of 17 μm.

The haze measured and tabulated in Table 4.

TABLE 4

| | Thickness of diffusion layer | Haze for diffusion layer | Total Haze | Imaging identity |
|---|---|---|---|---|
| Sample 4-1 | 12 μm | 75.79% | 98.92% | ○ |
| Sample 4-2 | 17 μm | 78.54% | 99.02% | ○ |

Figure 7A:
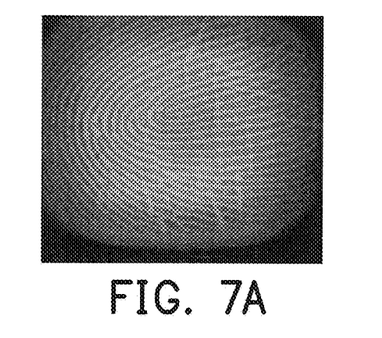
FIG. 7A and FIG. 7B are images in accordance with example 4.
Figure 7B:
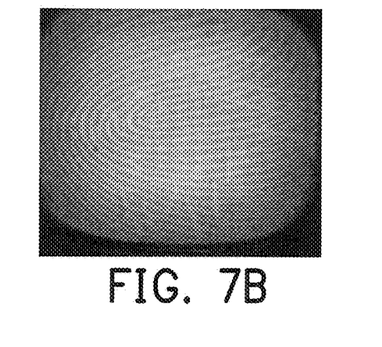

FIG. 7A and FIG. 7B showed the fingerprint images for sample 4-1 and sample 4-2. As shown in Table 4 and refer to FIG. 7A to FIG. 7B, both of them have good imaging identity.

Example 5

Preparation of Diffusion Layer Solution

Toluene and a little amount of isopropanol served as a solvent. The isopropanol (IPA) and diffusion particles (manufactured by JX Nippon oil & Energy Corporation, with a trade number NMB-0120C, refraction index of 1.49) had weight ratio of 0.03 (IPA/NMB-0120C=0.03). Fluorosurfactant (manufactured by 3M with a trade number of FC4432) served as a dispersant. The fluorosurfactant (FC4432) and diffusion particles NMB-0120C had weight ratio of 0.012 (FC4432/NMB-0120C=0.012). Toluene, isopropanol, NMB-0120C, fluorosurfactant, and UV glue (refractive index of 1.58) were mixed and stirred at room temperature for about 2 hours, a mixture (diffusion layer solution) was obtained and had solid content of about 45 wt %. The NMB-0120C (diffusion particles) and UV glue had weight ratio of 1.

The above mixture was coated on one flat surface of the PET film having a thickness of 90 μm to 95 μm which with microlens structure surface opposite to the flat surface to form a coated PET film. After drying at 80° C. for about 3 minutes, took it out and curried it with UV light to form a dry film with the thickness of 10 μm as sample 5-1.

Sample 5-2 was prepared same as sample 5-1, the difference in sample 5-2 was the thickness of the dry film of 15 μm.

The haze measured and tabulated in Table 5.

TABLE 5

| | Thickness of diffusion layer | Haze for diffusion layer | Total Haze | Imaging identity |
|---|---|---|---|---|
| Sample 5-1 | 10 μm | 96.81% | 99.06% | ○ |
| Sample 5-2 | 15 μm | 98.30% | 99.13% | ○ |

Figure 8A:
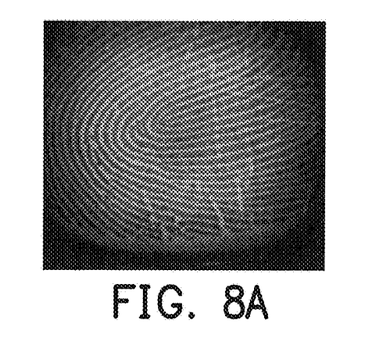
FIG. 8A and FIG. 8B are images in accordance with example 5.
Figure 8B:
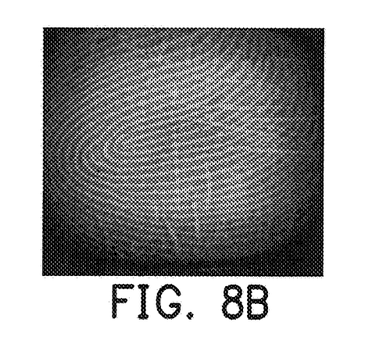

FIG. 8A and FIG. 8B showed the fingerprint images for sample 5-1 and sample 5-2. As shown in Table 5 and refer to FIG. 8A to FIG. 8B, both of them have good imaging identity.

Example 6

Preparation of Diffusion Layer Solution

Toluene and a little amount of isopropanol served as a solvent. The isopropanol (IPA) and diffusion particles (manufactured by JX Nippon oil & Energy Corporation, with a trade number NMB-0120C, refraction index of 1.49) had weight ratio of 0.03 (IPA/NMB-0120C=0.03). Fluorosurfactant (manufactured by 3M with a trade number of FC4432) served as a dispersant. The fluorosurfactant (FC4432) and diffusion particles NMB-0120C had weight ratio of 0.012 (FC4432/NMB-0120C=0.012). Toluene, isopropanol, NMB-0120C, fluorosurfactant, and UV glue (refractive index of 1.58) were mixed and stirred at room temperature for about 2 hours, a mixture (diffusion layer solution) was obtained and had solid content of about 30 wt %. The NMB-0120C (diffusion particles) and UV glue had weight ratio of 2.

The above mixture was coated on one flat surface of the PET film having a thickness of 90 μm to 95 μm which with microlens structure surface opposite to the flat surface to form a coated PET film. After drying at 80° C. for about 3 minutes, it was cured with UV light to form a dry film with the thickness of 5 μm as sample 6-1.

Sample 6-2 was prepared same as sample 6-1, the difference in sample 6-2 was the thickness of the dry film of 9 μm.

The haze measured and tabulated in Table 6.

TABLE 6

| | Thickness of diffusion layer | Haze for diffusion layer | Total Haze | Imaging identity |
|---|---|---|---|---|
| Sample 6-1 | 5 μm | 84.01% | 98.52% | ○ |
| Sample 6-2 | 9 μm | 98.09% | 99.21% | ○ |

Figure 9A:
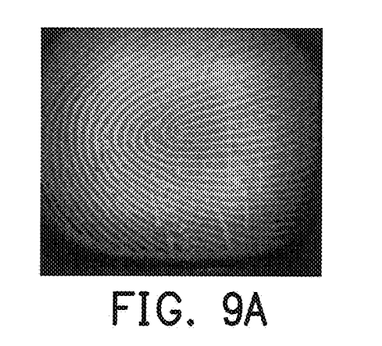
FIG. 9A and FIG. 9B are images in accordance with example 6.
Figure 9B:
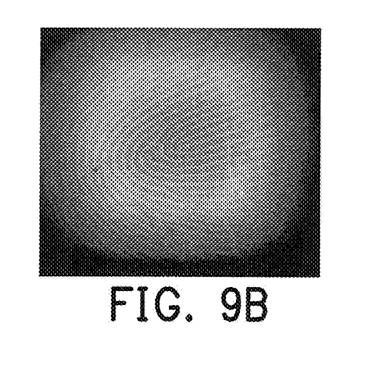

FIG. 9A and FIG. 9B showed the fingerprint images for sample 6-1 and sample 6-2. Both of them had good imaging identity.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A press sheet for fingerprint reader, comprising:
   a transparent substrate having a first surface and a second surface,
   a microstructure layer disposed on the first surface of the transparent substrate; and
   a diffusion layer disposed on the second surface of the transparent substrate, wherein the diffusion layer has a thickness of 1 μm to 80 μm, the first surface faces an optical imaging apparatus, and the diffusion layer comprises a plurality of diffusion particles and resin, wherein
   the resin and the diffusion particles have a refractive index difference of 0.01 to 1.5, and the diffusion particle has a particle size of 0.01 μm to 30.0 μm.

2. The press sheet for fingerprint reader of claim 1, wherein the resin comprises acrylic, epoxy resin, polyester, polyurethane (PU), PUacrylic, polysiloxane or a combination thereof.

3. The press sheet for fingerprint reader of claim 2, wherein the diffusion particles and the resin have a weight ratio of 0.01 to 2.0.

4. The press sheet for fingerprint reader of claim 1, wherein the diffusion particles comprise polystyrene, poly methyl acrylate, methyl methacrylate and styrene copolymer, polycarbonate, polyethylene, silicone resins, calcium carbonate, silica, titanium dioxide, or a combination thereof.

5. The press sheet for fingerprint reader of claim 1, wherein the transparent substrate comprises polyethylene terephthalate (PET), polycarbonate (PC), polymethyl methacrylate (PMMA), or cellulose triacetate (TAC).

6. The press sheet for fingerprint reader of claim 1, wherein the microstructure layer comprises at least one shape of prismatic (prism), lenticular lens (lenticular), semicircular dome, pyramid, cylinder or regular polygonal.

7. The press sheet for fingerprint reader of claim 6, wherein the microstructure has at least an arrangement of random or period.

8. The press sheet for fingerprint reader of claim 1, wherein the transparent substrate and the microstructure layer are integrated.

9. The press sheet for fingerprint reader of claim 1, further comprises a protection layer disposed on the diffusion layer.

10. The press sheet for fingerprint reader of claim 9, wherein the protection layer comprises a hard coating.

11. A fingerprint reader, comprising:
   a press sheet for fingerprint reader of claim 1; and
   at least an optical imaging apparatus arranged towards to the press sheet.

12. The fingerprint reader of claim 11, wherein the optical imaging apparatus comprises a light source and optic camera lens.

* * * * *